United States Patent
Metzger et al.

(10) Patent No.: US 11,862,784 B2
(45) Date of Patent: Jan. 2, 2024

(54) PROCESS FOR MAKING A CATHODE ACTIVE MATERIAL FOR A LITHIUM ION BATTERY

(71) Applicant: BASF SE, Ludwigshafen am Rhein (DE)

(72) Inventors: Michael Metzger, Munich (DE); Hans Beyer, Munich (DE); Johannes Sicklinger, Munich (DE); Daniel Pritzl, Munich (DE); Benjamin Strehle, Munich (DE); Hubert Gasteiger, Munich (DE); Hadar Sclar, Ramat-Gan (IL); Evan Erickson, Ramat-Gan (IL); Francis Amalraj Susai, Ramat-Gan (IL); Judith Grinblat, Ramat-Gan (IL); Doron Aurbach, Bne Brak (IL); Boris Markovsky, Petah-Tikwa (IL)

( * ) Notice: Subject to any disclaimer, the term of this patent is extended or adjusted under 35 U.S.C. 154(b) by 414 days.

(21) Appl. No.: 16/626,939

(22) PCT Filed: Jun. 22, 2018

(86) PCT No.: PCT/EP2018/066725
§ 371 (c)(1),
(2) Date: Dec. 27, 2019

(87) PCT Pub. No.: WO2019/002116
PCT Pub. Date: Jan. 3, 2019

(65) Prior Publication Data
US 2020/0144594 A1 May 7, 2020

(30) Foreign Application Priority Data

Jun. 28, 2017 (EP) .................. 17178267
Jan. 30, 2018 (EP) .................. 18154214

(51) Int. Cl.
| | | |
|---|---|---|
| H01M 4/04 | (2006.01) | |
| H01M 4/505 | (2010.01) | |
| H01M 4/525 | (2010.01) | |
| H01M 10/0525 | (2010.01) | |
| C01G 53/00 | (2006.01) | |
| C01G 45/12 | (2006.01) | |
| H01M 10/052 | (2010.01) | |

(52) U.S. Cl.
CPC ........ H01M 4/0471 (2013.01); C01G 45/125 (2013.01); C01G 53/50 (2013.01); H01M 4/505 (2013.01); H01M 4/525 (2013.01); H01M 10/0525 (2013.01); C01P 2004/82 (2013.01); C01P 2006/12 (2013.01); H01M 10/052 (2013.01)

(58) Field of Classification Search
None
See application file for complete search history.

(56) References Cited

U.S. PATENT DOCUMENTS

| | | |
|---|---|---|
| 7,244,530 B2 | 7/2007 | Hambitzer et al. |
| 2010/0151332 A1 | 6/2010 | Lopez et al. |
| 2010/0193730 A1 | 8/2010 | Yamamura |
| 2011/0117437 A1 | 5/2011 | Watanabe et al. |
| 2012/0119167 A1 | 5/2012 | Matsumoto et al. |
| 2013/0183586 A1* | 7/2013 | Schulz-Dobrick .... H01M 4/505 429/223 |
| 2013/0216701 A1 | 8/2013 | Lopez et al. |
| 2014/0302388 A1 | 10/2014 | Li et al. |
| 2015/0243971 A1 | 8/2015 | Cho et al. |
| 2015/0295277 A1 | 10/2015 | Takahashi et al. |
| 2016/0226068 A1* | 8/2016 | Xia ................... C01G 45/1257 |
| 2017/0069911 A1 | 3/2017 | Volkov et al. |

FOREIGN PATENT DOCUMENTS

| | | | |
|---|---|---|---|
| CN | 101986441 A | 3/2011 | |
| CN | 102208607 A | 10/2011 | |
| CN | 105800586 A | 7/2016 | |
| EP | 3093272 A1 * | 11/2016 | .......... C01G 53/006 |
| JP | 2003-123755 A | 4/2003 | |
| JP | 2003123755 A * | 4/2003 | |
| JP | 2004-536427 A | 12/2004 | |
| JP | 2006-318815 A | 11/2006 | |
| KR | 10-2015-0049288 A | 5/2015 | |
| WO | WO 2009/040668 A2 | 4/2009 | |

OTHER PUBLICATIONS

Machine Translation of JP 2003-123755 A (Year: 2003).*
International Search Report dated Sep. 20, 2018 in PCT/EP2018/066725 filed on June 22, 2018.
Extended European Search Report dated Sep. 19, 2017 in Patent Application No. 17178267.5, 3 pages.

* cited by examiner

Primary Examiner — Robert S Carrico
(74) Attorney, Agent, or Firm — Armstrong Teasdale LLP

(57) ABSTRACT

A process for making a cathode active material for a lithium ion battery is described. The process includes (a) a step of synthesizing a mixed oxide of formula $Li_{1+x}TM_{1-x}O_2$ at a temperature ranging from 750 to 1000° C. in an oxidizing atmosphere, where TM is a combination of two or more transition metals of Mn, Co and Ni and, optionally, at least one more metal of Ba, Al, Ti, Zr, W, Fe, Cr, K, Mo, Nb, Mg, Na and V, and x is a number ranging from zero to 0.2, (b) a step of cooling down the material obtained from step (a) to a temperature ranging from 100 to 400° C., (c) a step of adding at least one reactant of $BF_3$, $SO_2$ and $SO_3$ at the temperature of 100 to 400° C., and (d) a step of cooling down to a temperature of 50° C. or below.

11 Claims, No Drawings

PROCESS FOR MAKING A CATHODE ACTIVE MATERIAL FOR A LITHIUM ION BATTERY

The present invention relates to a process for making a cathode active material for a lithium ion battery, said process comprising the following steps:

(a) synthesizing a mixed oxide according to general formula $Li_{1+x}TM_{1-x}O_2$ at a temperature in the range of from 750 to 1000° C. in an oxidizing atmosphere, wherein TM is a combination of two or more transition metals selected from Mn, Co and Ni and, optionally, at least one more metal selected from Ba, Al, Ti, Zr, W, Fe, Cr, K, Mo, Nb, Mg, Na and V, and wherein x is in the range of from zero to 0.2, (b) cooling down the material obtained from step (a) to a temperature in the range of from 100 to 400° C., (c) adding at least one reactant selected from $BF_3$, $SO_2$, and $SO_3$ at said 100 to 400° C., (d) cooling down to a temperature of 50° C. or below.

Storing energy has long been a subject of growing interest. Electrochemical cells, for example capacitators, batteries or accumulators, can serve to store electrical energy. As of recently, lithium ion batteries have attracted particular interest. They are superior to the conventional batteries in some technical aspects. For instance, they can be used to produce voltages unobtainable with batteries based on aqueous electrolytes.

In lithium ion batteries, the materials from which the electrodes are made, and more particularly the material from which the cathode is made, play an important role.

In many cases, lithium-containing mixed transition metal oxides are used as the cathode active material, especially lithium-containing nickel-cobalt-manganese oxides. These are generally produced by first producing a precursor, for example a mixed carbonate or mixed hydroxide of manganese, nickel and cobalt, and mixing the precursor with a lithium compound, for example with LiOH or $Li_2CO_3$, and then treating it thermally at temperatures in the range from 750 to 1000° C.

Undesired gassing in lithium ion batteries upon contact with an acidic electrolyte is frequently attributed to high carbonate contents of the cathode active material. In addition, carbonate on the surface of the cathode active material is believed to have a detrimental effect on the cell's capacity upon cycling. Acids may be formed in situ in the non-aqueous electrolytes of lithium ion batteries by decomposition of, e.g., a fluorine containing complex such as $LiPF_6$ in the presence of traces of water. It has been observed that an above-average high content of carbonate of the cathode active material is found when the starting material is a mixed transition metal carbonate or when lithium carbonate is chosen as a lithium source. In the case of use of hydroxides or oxyhydroxides as precursors, undesirably high carbonate concentrations may result from absorption of carbon dioxide from the air in industrial operation.

Various methods have been proposed to reduce carbonate in lithium ion battery cathode materials. One of the methods proposed is washing with water right before assembling the electrode, see, e.g., US 2012/0119167. However, the overall capacity is usually not improved.

In addition, many cathode active materials are sensitive to $CO_2$ and moisture upon storage.

It was therefore an objective to provide a method to make a cathode active material for a lithium ion battery that shows improved electrochemical behavior such as high capacity retention, cyclability and reduced gassing. It was further an objective of the present invention to improve the stability of cathode active materials during storage.

Accordingly, the process defined at the outset has been found, hereinafter also referred to as inventive process. The inventive process will be explained in more detail below.

The inventive process comprises four steps (a), (b), (c), and (d), hereinafter also referred to as step (a), step (b), step (c) and step (d).

Step (a) refers to synthesizing a mixed oxide according to general formula $Li_{1+x}TM_{1-x}O_2$ at a temperature in the range of from 750 to 1000° C. in an oxidizing atmosphere, wherein TM is a combination of two or more transition metals selected from Mn, Co and Ni and, optionally, at least one more metal selected from Ba, Al, Ti, Zr, W, Fe, Cr, K, Mo, Nb, and V, and wherein x is in the range of from zero to 0.2, preferably 0.01 to 0.05.

TM may be selected from combinations of Mn and Co, or Mn and Ni, and Ni and Co, and from combinations of Ni, Mn and Co and, optionally, in each case at least one more metal selected from Ba, Al, Ti, Zr, W, Fe, Cr, K, Mo, Nb, Mg, Na and V, preferably at least one of Al, W, Ti and Zr. Preferred are combinations of Ni and Co and of Ni and Co and Mn, and, optionally, in each case at least one more metal selected from Al, W, Ti and Zr.

In a preferred embodiment, TM is a combination of metals according to general formula (I)

$$Ni_aCo_bMn_cM_d \quad (I)$$

with a being in the range of from 0.3 to 0.9, preferably 0.33 to 0.8, b being in the range of from 0.05 to 0.4, preferably 0.1 to 0.33, c being in the range of from 0.05 to 0.6, preferably 0.1 to 0.33, and d being in the range of from zero to 0.1, preferably 0.001 to 0.005, M being selected from Ba, Al, Ti, Zr, W, Fe, Cr, K, Mo, Nb, Mg, Na and V, including combinations of at least two of the foregoing, preferably M is selected from Al, W, Ti and Zr and combinations of at least two of the foregoing, and a+b+c+d=1.

In a particularly preferred embodiment, TM is selected from $Ni_{0.33}Co_{0.33}Mn_{0.33}$, $Ni_{0.5}Co_{0.2}Mn_{0.3}$, $Ni_{0.6}Co_{0.2}Mn_{0.2}$, $Ni_{0.8}Co_{0.1}Mn_{0.1}$, $Ni_{0.85}Co_{0.1}Mn_{0.05}$, and $Ni_{0.7}Co_{0.2}Mn_{0.1}$. In another embodiment, TM is selected from $Ni_{0.4}Co_{0.2}Mn_{0.4}$.

In yet a further embodiment, $Li_{1+x}TM_{1-x}O_2$ is selected from $0.35Li_2MnO_3 \cdot 0.65LiNi_{0.35}Mn_{0.45}Co_{0.20}O_2$, $0.33Li_2MnO_3 \cdot 0.67Li(Ni_{0.4}Co_{0.2}Mn_{0.4})O_2$, $0.42Li_2MnO_3 \cdot 0.58Li(Ni_{0.4}Co_{0.2}Mn_{0.4})O_2$, $0.50Li_2MnO_3 \cdot 0.50Li(Ni_{0.4}Co_{0.2}Mn_{0.4})O_2$, $0.40Li_2MnO_3 \cdot 0.60Li(Ni_{0.8}Co_{0.1}Mn_{0.1})O_2$, and $0.42Li_2MnO_3 \cdot 0.58Li(Ni_{0.6}Mn_{0.4})O_2$.

Said TM may contain traces of other metal ions, for example traces of ubiquitous metals such as sodium, Ca or Zn, but such traces will not be taken into account in the description of the present invention. Traces in this context will mean amounts of 0.05 mol % or less, referring to the total metal content of TM.

In a usual process for carrying out step (a), first a so-called precursor is being formed by co-precipitating the transition metals as carbonates, oxides or preferably as hydroxides that may or may not be basic. The precursor is then dried and mixed with a lithium salt such as, but not limited to $Li_2O$, $LiNO_3$ or—especially—$Li_2CO_3$ or LiOH followed by calcination. Calcination may be performed at a temperature in the range of from 750 to 1000° C., in one or more steps, for example in three steps at three different temperatures, preferably from 800 to 900° C.

Suitable reaction vessels for step (a) of the inventive process are, for example, fluidized bed reactors, tunnel kilns, roller hearth kilns, rotary kilns, and pendulum kilns. Roller hearth kilns and rotary kilns are preferred.

In one embodiment of the present invention, step (a) of the inventive process is being performed over a period of time of 1 hour to 24 hours, preferably 90 minutes to 8 hours. Step (a) may be carried out continuously or batch-wise. In embodiments in which step (a) is carried out continuously the time refers to the average residence time.

In one embodiment of the present invention, temperature changes during step (a) are being performed slowly or in an expedited way. It is thus possible to choose a slow heating rate such as 1 to 3° C./min. In other embodiments, fast heating rates are chosen such as 5 to 25° C./min. Cooling can be performed at different rates as well.

In a preferred embodiment, the oxidizing atmosphere in step (a) is selected from air, oxygen and oxygen-enriched air. Oxygen-enriched air may be, for example, a 50:50 by volume mix of air and oxygen. Other options are 1:2 by volume mixtures of air and oxygen, 1:3 by volume mixtures of air and oxygen, 2:1 by volume mixtures of air and oxygen, and 3:1 by volume mixtures of air and oxygen.

In one embodiment of the present invention, step (a) of the present invention is performed under a flow of gas, for example air, oxygen and oxygen-enriched air. Such stream of gas may be termed a forced gas flow. Such stream of gas may have a velocity in the range of from 2 to 20 m$^3$/hkg material to general formula $Li_{1+x}TM_{1-x}O_2$. The volume is determined under normal conditions ambient temperature and 1 atmosphere. Said stream of gas is useful for removal of gaseous cleavage products such as water and carbon dioxide.

Mixed oxide according to general formula $Li_{1+x}TM_{1-x}O_2$ obtained in step (a) is usually in particulate form. The term "particulate" in the context with material of general formula (I) shall mean that said material is provided in the form of particles with a maximum particle diameter not exceeding 32 μm. Said maximum particle diameter can be determined by, e. g. sieving.

In one embodiment of the present invention, mixed oxide according to general formula $Li_{1+1}TM_{1-x}O_2$ is comprised of spherical particles, that are particles have a spherical shape. Spherical particles shall include not just those which are exactly spherical but also those particles in which the maximum and minimum diameter of at least 90% (number average) of a representative sample differ by not more than 10%.

In one embodiment of the present invention, mixed oxide according to general formula $Li_{1+1}TM_{1-x}O_2$ is comprised of secondary particles that are agglomerates of primary particles. Preferably, the mixed oxide according to general formula $Li_{1+x}TM_{1-x}O_2$ is comprised of spherical secondary particles that are agglomerates of primary particles. Even more preferably, the mixed oxide according to general formula $Li_{1+x}TM_{1-x}O_2$ is comprised of spherical secondary particles that are agglomerates of spherical primary particles or platelets.

In one embodiment of the present invention, the mean particle diameter (D50) of secondary particles of mixed oxide according to general formula $Li_{1+x}TM_{1-x}O_2$ is in the range of from 6 to 12 μm, preferably 7 to 10 μm. The mean particle diameter (D50) in the context of the present invention refers to the median of the volume-based particle diameter, as can be determined, for example, by light scattering.

In one embodiment of the present invention, primary particles of mixed oxide according to general formula $Li_{1+x}TM_{1-x}O_2$ have an average diameter in the range from 1 to 2000 nm, preferably from 10 to 1000 nm, particularly preferably from 50 to 500 nm. The average primary particle diameter can, for example, be determined by SEM or TEM. SEM is an abbreviation of scanning electron microscopy, TEM is an abbreviation of transmission electron microscopy In one embodiment of the present invention, the specific surface area, measured in accordance with the Brunauer Emmett Teller method and hereinafter abbreviated as surface (BET), of mixed oxide according to general formula $Li_{1+x}TM_{1-x}O_2$ is in the range of from 0.1 to 10 m$^2$/g, preferably from 0.25 to 0.5 m$^2$/g. The surface (BET) can be determined by nitrogen absorption, for example according to DIN 66131. The surface (BET) of mixed oxide according to general formula $Li_{1+x}TM_{1-x}O_2$ in which Mn is at least 50 mol %, referring to the entire TM portion, is preferably in the range of from 3 to 8 m$^2$/g, for example 5 to 6 m$^2$/g.

In step (a), a mixed oxide according to general formula $Li_{1+x}TM_{1-x}O_2$ is obtained.

In step (b) of the inventive process, said material is cooled down to a temperature in the range of from 100 to 400° C., preferably 100 to 300° C. and even more preferably 120 to 240° C.

Step (b) may take a time in the range of from 20 minutes to 16 hours. Step (b) may be carried out continuously or batch-wise. In embodiments in which step (b) is carried out continuously the time refers to the average residence time.

It is possible to carry out step (b) by simply removing the heated good from the reaction vessel and to thus apply an exponential cooling rate. It is possible to quench the heated good, for example with air at ambient temperature, or to store it in a room wherein the temperature is controlled in the range of from 100 to 400° C., preferably 100 to 300° C.

Step (b) may be carried out in the same apparatus as step (a), preferably in a different part, for example in a different zone of a pusher kiln, of a rotary kiln or of a roller hearth kiln. In other embodiments, step (b) is carried out in a separate apparatus.

In one embodiment of the present invention, step (b) is carried out at atmospheric pressure. In other embodiments, it is possible to carry out step (b) at reduced pressure, for example from 1 mbar to 950 mbar.

In one embodiment of the present invention, step (b) is performed in a period of time of 5 minutes to 4 hours, preferably 30 minutes to 2 hours.

In step (c), at least one reactant selected from $BF_3$, $SO_2$ and $SO_3$ is added at said 100 to 400° C. which means that when the temperature has reached a "window in the range of from 100 to 400° C." said reactant is added. It is thus avoided to cool down the mixed oxide according to general formula $Li_{1+x}TM_{1-x}O_2$ to ambient temperature and to then treat it with reactant.

Said treatment according to step (c) may be accomplished in various ways. For example, it is possible to add said reactant to a stream of oxygen, oxygen-enriched dry air, dry air, nitrogen, a noble gas or a combination of at least two of the foregoing. In other embodiments, it is possible to add the reactant directly to the mixed oxide according to general formula $Li_{1+x}TM_{1-x}O_2$. In other embodiments, it is possible to produce $BF_3$, $SO_2$ or $SO_3$ in situ, for example by adding a substance that generates $BF_3$, $SO_2$ or $SO_3$ at 100 to 400° C., for example by oxidizing $SO_2$ to $SO_3$.

$SO_2$ may be added in pure form or with impurities, such as 0.01 to 30 mol % $SO_3$. It is also possible to generate $SO_2$ in situ, for example by heating a mixed oxide according to general formula $Li_{1+1}TM_{1-x}O_2$ in the presence of ammonium sulfate to a temperature of 250° C. or above.

$SO_3$ may be added in pure form or with impurities, such as 0.01 to 30 mol % $SO_2$. In embodiments wherein $SO_3$ is made in situ by oxidation of $SO_2$ to $SO_3$ the $SO_3$ generated usually contains some $SO_2$. Preferably, the fraction of $SO_2$ is 0.1 to 5 mol %.

In one embodiment of the present invention the concentration of the reactant is in the range of from 0.1 to 3% by volume, referring to the atmosphere, in which step (c) is carried out. The percentage is then referring to the beginning of step (c). In a special embodiment, concentration of the reactant is in the range of from 0.1 to 3% by volume, referring to the stream of gas that is used in step (c).

In many embodiments, said reactant is not converted completely. Without wishing to be bound by any theory, it is believed that the reactant only reacts with the most active sites of mixed oxide according to general formula $Li_{1+x}TM_{1-x}O_2$. Without wishing to be bound by any theory, it is believed that a non-continuous monolayer of sulfite, borate or sulfate is formed. Counterions may be, e.g., $Ni^{2+}$ and/or $Li^+$.

In one embodiment of the present invention, step (c) is performed in a period of time of 15 minutes to 6 hours.

Step (d) comprises cooling down the product obtained in step (c) to a temperature of 50° C. or below. Step (d) is preferably carried out without addition of more reactant selected from $BF_3$ or $SO_2$ or $SO_3$.

In one embodiment of the present invention, steps (c) and (d) are performed in an atmosphere of air, oxygen, nitrogen, a noble gas or a combination of at least two of the foregoing. In the case of step (c), the term "an atmosphere of air, oxygen, nitrogen, a noble gas or a combination of at least two of the foregoing" includes the presence of reactant such as $BF_3$, $SO_2$ or $SO_3$.

In embodiments wherein $SO_2$ is the reactant step (c) is preferably performed in an atmosphere of nitrogen or a noble gas.

In one embodiment of the present invention, between steps (c) and (d), a step (e) of maintaining the temperature in the range of from 100 to 400° C., preferably from 100 to 300° C. is added. In said step (e), no reactant $SO_2$, $BF_3$ or $SO_3$ is added.

In one embodiment of the present invention, step (a) and at least one of steps (b) to (d) or (e), if applicable, are performed under a flow of gas such as air, oxygen, nitrogen, a noble gas or a combination of at least two of the foregoing.

Air and oxygen used in steps (b) to (d) are preferably dry air or dry oxygen, respectively. Dry means in this context that the water content is in the range of from 0.1 ppm to 0.1% and the $CO_2$ content is in the range of from 0.1 to 500 ppm, % and ppm in each case referring to volume.

Nitrogen and/or noble gases if used in steps (b) to (d) are preferably dry nitrogen or dry noble gases, respectively. Dry means in this context that the water content is in the range of from 0.1 ppm to 0.1% and the $CO_2$ content is in the range of from 0.1 to 500 ppm, % and ppm in each case referring to parts per million of volume.

In one embodiment of the present invention, steps (a) to (d) are performed in a roller hearth kiln, a pusher kiln or a rotary kiln, or a combination of at least two of the foregoing. In another embodiment, a pendulum kiln is feasible. Rotary kilns have the advantage of a very good homogenization of the material made therein. In roller hearth kilns and in pusher kilns, different reaction conditions with respect to different steps may be set quite easily.

In those embodiments of the present invention wherein step (c) is performed under a forced flow of gas but conversion of the reactant is incomplete, it is advantageous to clean the off-gas, for example by means of a thermal treatment or by off-gas washing.

In one embodiment of the present invention, additional steps may be performed to carry out the inventive process. For example, it is possible to cool down the material obtained after step (b) to ambient temperature and to again to 500 to 700° C. followed by cooling down to 100 to 400° C., preferably 100 to 300° C. and subsequently performing step (c). Such intermediary steps may be useful in embodiments wherein steps (b) and (c) are carried out in a different site than steps (a) and (b). However, it is preferred to carry out step (c) right after step (b).

Cathode active materials obtained according to the present invention show an improved cyclability and capacity retention in comparison with non-treated cathode active materials. In addition, an improved initial capacity and a reduced gassing may be observed. In addition, an increased robustness upon storage may be observed.

Another aspect of the present invention refers to cathode active materials, hereinafter also referred to as inventive cathode active materials. Inventive cathode active materials have the general formula $Li_{1+x}TM_{1-x}O_2$ wherein TM is a combination of two or more transition metals selected from Mn, Co and Ni and, optionally, at least one more metal selected from Ba, Al, Ti, Zr, W, Fe, Cr, K, Mo, Nb, Mg, Na and V, and wherein x is in the range of from zero to 0.2, and they additionally comprise a combination of sulfite and sulfate of Li or TM, for example, Ni, Co or Mn or a combination of at least two of the foregoing or a combination of Li and at least one of TM. Preferably, inventive cathode active materials contain a total amount of sulfur the form of sulfites and sulfates. The amount of sulfur on the surface of inventive cathode active materials and its oxidation state may be determined by X-ray photoelectron spectroscopy, in brief "XPS".

Without wishing to be bound by any theory we believe that the sulfur containing species are located on the surface of inventive cathode active materials but not as a homogeneous coating according to structural and surface studies.

TM has been defined in more detail above.

Inventive cathode active materials show an improved cyclability and capacity retention in comparison with non-treated cathode active materials. In addition, an improved initial capacity and a reduced gassing and a better cycling behavior may be observed. In addition, an increased robustness upon storage may be observed.

The present invention is further illustrated by working examples.

GENERAL REMARKS

The following precursors were used:

A precursor was made by precipitating a mixed Ni—Co—Mn carbonate from a solution containing nickel sulfate/cobalt sulfate/manganese sulfate in a molar ratio of 23:12:65 followed by drying under air at 200° C. Precipitating agent was aqueous sodium carbonate solution in aqueous ammonia solution. Average particle diameter (D50): 10.2 µm.

Nl: liters at "normal conditions": 20° C./one atmosphere.
I. Manufacture of Cathode Active Materials
I.1: Manufacture of Oxide MO.1

Step (a.1): The following equipment is used: in a roller hearth kiln, a saggar filled with an intimate mixture of precursor and $Li_2CO_3$ so the molar ratio of lithium to the sum of transition metals is 1.42:1. Said mixture is heated to 800° C. in a forced stream of air. When a temperature of 800° C. is reached, heating is continued at 800° C. over a period of time of 4 hours. The formation of metal oxide (MO.1) is observed, formula $0.42Li_2MnO_3.0.58Li(Ni_{0.4}Co_{0.2}Mn_{0.4})O_2$. This corresponds to a formula of $Li_{1.17}TM_{0.83}O_2$.

Step (b.1): in the same roller hearth kiln, the saggar is moved on and allowed to cool down to 120° C. within two hours in dry oxygen (30% by vol) in Ar.

Step (c.1): The air supply is shut down and replaced by $O_2/Ar/SO_3$ mixture in a ratio of 30:70:0.5 by volume. Over 30 minutes, metal oxide (MO.1) is exposed to a gas stream of $O_2/Ar/SO_3$. Since the $SO_3$ has been made in parallel by a one-stage $SO_2$-oxidation at a $V_2O_5$-catalyst the $SO_3$ contains some $SO_2$ (maximum 30% by mole).

After said treatment according to step (c.1), the material so obtained was cooled down to ambient temperature, step (d.1). MO.1 was obtained.

I.2: Manufacture of Oxide MO.2

Step (a.1) is repeated as above.

Step (b.2): in the same roller hearth kiln, the saggar is moved on and allowed to cool down to 200° C. within two hours in dry oxygen (30% by vol) in Ar.

Step (c.2): The air supply is shut down and replaced by $O_2/Ar/SO_3$ mixture in a ratio of 30:70:0.5 by volume. Over one hour, metal oxide (MO.1) is exposed to a gas stream of $O_2/Ar/5O3$. Since the $SO_3$ has been made in parallel by a one-stage $SO_2$-oxidation at a $V_2O_5$-catalyst the $SO_3$ contains about 5% by vol. of $SO_2$.

After said treatment according to step (c.2), the material so obtained is cooled down to ambient temperature, step (d.2). MO.2 is obtained. MO.2 has a sulfur content of 0.9% by weight, determined by combustion analysis ("CHNS"). Compared to C-MO.3, the difference is 0.6% by weight.

I.3: Manufacture of Comparative Oxide C-MO.3 (No $SO_3$ Treatment)

Step (a.1): The following equipment is used: in a roller hearth kiln, a saggar filled with an intimate mixture of precursor and $Li_2CO_3$ so the molar ratio of lithium to the sum of transition metals is 1.42:1. Said mixture is heated to 800° C. in a forced stream of air. The formation of metal oxide (MO.1) is observed, formula $0.42Li_2MnO_3\ 0.58Li(Ni_{0.4}Co_{0.2}Mn_{0.4})O_2$.

Then, the material so obtained is cooled down to ambient temperature, step (d.3). C-MO.3 was obtained. The residual sulfur content was 0.3% by weight, determined by CHNS. The sulfate most likely stems from sulfate adsorbed during the precipitation process.

I.4: Manufacture of MO.4:

Step (a.1) was repeated as above.

Step (b.4): in the same roller hearth kiln, the saggar was moved on and allowed to cool down to 400° C. within two hours in pure nitrogen.

Step (c.4-1): The $N_2$ supply was shut down and replaced by $N_2/SO_2$ mixture in a ratio of 98:2 by volume. Over 2 hours, metal oxide (MO.1) was exposed to a flow of $N_2/SO_2$, 6 cm$^3$/min. No impurities of the $SO_3$ were detectable.

After said treatment according to step (c.4-1), the material so obtained was cooled down to ambient temperature, step (d.4). MO.4-1 was obtained. In MO.4-1 the resulting ratio of sulfur to the sum of transition metals, S/(Ni+Mn+Co) was 0.47% by weight, determined Inductively Coupled Plasma ("ICP"). From the S 2p peak of XPS spectra the amounts of sulfates were estimated as follows: 16% sulfates of transition metals [i.e., $MnSO_4$, $NiSO_4$, and $CoSO_4$,] and 84% of $Li_2SO_4$.

Step (c.4-1) was repeated with fresh samples from (b.4), but the treatments with $N_2/SO_2$ had durations of 60 or 30 minutes, respectively. MO.4-2 and MO.4-3 were obtained.

TABLE 1

Storage of cathode active materials

| | storage conditions | Test product |
|---|---|---|
| MO.1 | Inert atmosphere | MO.1* |
| MO.2 | Inert atmosphere | MO.2* |
| MO.4-1 | Inert atmosphere | MO.4-1* |
| MO.1 | Ambient conditions | MO.1** |
| MO.2 | Ambient conditions | MO.2** |
| MO.4 | Ambient conditions | MO.4-1** |
| C-MO.3 | Inert atmosphere | C-MO.3* |
| C-MO.3 | Ambient conditions | C-MO.3** |

"Inert atmosphere": Ar-filled glovebox (25° C., <0.1 ppm $H_2O$ and $CO_2$)
"Ambient conditions": 1 week, 25° C., 100% relative humidity, atmospheric $CO_2$ I.5: Manufacture of MO.5-1 and MO.5-2

A precursor was made by precipitating a mixed Ni—Co—Mn carbonate from a solution containing nickel sulfate/cobalt sulfate/manganese sulfate in a molar ratio of 85:10:05 followed by drying under air at 120° C. and sieving. Precipitating agent was aqueous sodium hydroxide solution in aqueous ammonia solution. Average particle diameter (D50): 11.0 µm.

Step (a.5): The following equipment is used: in a roller hearth kiln, a saggar was filled with an intimate mixture of the above precursor and LiOH monohydrate so the molar ratio of lithium to the sum of transition metals was 1.03:1. Said mixture was heated to 760° C. in a forced stream of a mixture of $N_2:O_2$ 40:60 in volume %. When a temperature of 760° C. is reached, heating is continued at 760° C. over a period of time of 10 hours. The formation of metal oxide (MO.5) was observed, formula $Li_{1.02}(Ni_{0.85}Co_{0.10}Mn_{0.05})O_{2.02}$.

Step (b.5): in the same roller hearth kiln, the saggar was moved on and allowed to cool down to 400° C. within two hours in pure nitrogen.

Step (c.5-1): The $N_2$ supply was shut down and replaced by $N_2/SO_2$ mixture in a ratio of 98:2 by volume. Over 5 minutes, metal oxide (MO.5-1) was exposed to a flow of $N_2/SO_2$, 6 cm$^3$/min. No impurities of the $SO_2$ were detectable.

Step (c.5-2): The $N_2$ supply was shut down and replaced by $N_2/SO_2$ mixture in a ratio of 98:2 by volume. Over 20 minutes, metal oxide (MO.5-2) was exposed to a flow of $N_2/SO_2$, 6 cm$^3$/min. No impurities of the $SO_2$ were detectable.

After said treatment according to step (c.5-1) or (c.5-2, the materials so obtained were cooled down to ambient temperature, step (d.5). MO.5-1 and (MO.5-2) were obtained.

II. Testing of Cathode Active Materials

To produce a cathode, the following ingredients are blended under stirring with one another under inert conditions:

46.25 g of active material, 1.75 g polyvinylidene difluoride, ("PVdF"), commercially available as Kynar Flex® 2801 from Arkema Group, 2 g carbon black, BET surface area of 62 m$^2$/g, commercially available as "Super C 65L" from Timcal.

While stirring, a sufficient amount of N-methylpyrrolidone (NMP) is added in several steps and the mixture is stirred with a planetary orbital mixer (Thinky) until a stiff, lump-free paste has been obtained.

Cathodes are prepared as follows: On an 18 μm thick aluminum foil, the above paste is applied with a 100 μm four-edge-blade. The loading after drying is 1.5 mAh/cm². Disc-shaped cathodes with a diameter of 14 mm are punched out of the foil and compressed at 2.5 t for 20 seconds. The cathode discs are then weighed, dried for 14 hours in a vacuum oven at 120° C. and introduced into an argon glove box without exposure to ambient air. Then, cells with the cathodes are assembled.

Electrochemical testing was conducted in "CR2032" coin type cells. The electrolyte used was 80 μl of a 1 M solution of $LiPF_6$ in fluoroethylene carbonate/diethyl carbonate/fluorinated ether K2 (volume ratio 64:12:24).

Alternatively, electrochemical testing was conducted in coin cells of 2325-type fabricated with Li-metal counter electrodes, two Celgard 2500 polypropylene separators, and electrolyte solution (LP57, BASF) comprising ethylene carbonate-ethyl methyl carbonate (3:7), and 1M $LiPF_6$.

Anode: lithium foil, thickness 0.45 mm, separated from the cathode by two glass-fiber separators, thickness 0.025 mm each

TABLE 2

Cycling conditions of inventive cells and comparative cells

| | Segment | Potential range [V vs. Li⁺/Li] | C-rate Charge | C-rate Discharge | Cycles |
|---|---|---|---|---|---|
| 1 | Activation | 4.8-2.0 | C/15 (CC) | C/15 (CC) | 1 |
| 2 | Slow cycling | 4.7-2.0 | C/10 (CC) | C/10 (CC) | 3 |
| 3 | DCIR pulse | (40% SOC)-2.0 | C/10 (CC) | C/10 (CC) | 1 |
| 4 | Fast cycling | 4.7-2.0 | C/2 (CCCV) | 3C (CC) | 3 |
| 5 | Standard cycling | 4.7-2.0 | C/2 (CCCV) | 1C (CC) | 33 |

Segments 2 to 5 are looped. C-rate referenced to 250 $mAh/g_{HE\text{-}NCM}$; CC (constant current), CCCV (constant current constant voltage with C/10 lower current limit), DCIR (direct current internal resistance) measurement at 40% SOC (state of charge).

TABLE 3

Specific discharge capacities at ambient temperature.

| sample | rate | Specific discharge capacity [$mAh/g_{HE\text{-}NMC}$] at cycle number | | | | | |
|---|---|---|---|---|---|---|---|
| | | 40 (1 C) 44 (0.1 C) 48 (3 C) | 80 (1 C) 84 (0.1 C) 88 (3 C) | 120 (1 C) 124 (0.1 C) 128 (3 C) | 160 (1 C) 164 (0.1 C) 168 (3 C) | 200 (1 C) 204 (0.1 C) 208 (3 C) | 240 (1 C) 244 (0.1 C) 248 (3 C) |
| C-MO. 3* | 1 C | 221 ± 1 | 214 ± 1 | 210 ± 1 | 207 ± 2 | 195 ± 2 | 201 ± 2 |
| | 0.1 C | 251 ± 0 | 245 ± 4 | 249 ± 0 | 248 ± 0 | 200 ± 47 | 245 ± 0 |
| | 3 C | 174 ± 3 | 167 ± 4 | 163 ± 4 | 157 ± 4 | 149 ± 6 | 142 ± 6 |
| MO. 1* | 1 C | 224 ± 1 | 218 ± 1 | 215 ± 1 | 213 ± 1 | 210 ± 1 | 207 ± 1 |
| | 0.1 | 250 ± 0 | 249 ± 0 | 249 ± 0 | 248 ± 0 | 247 ± 1 | 246 ± 0 |
| | 3 C | 185 ± 1 | 179 ± 1 | 174 ± 3 | 169 ± 4 | 164 ± 4 | 154 ± 6 |

Average and maximum deviation of two cells per sample

TABLE 3a

Specific capacities of first activation at 30° C.

| | 1st C [mA · h/g] | 1st D [mA · h/g] | 1st C. E. [%] |
|---|---|---|---|
| C-MO.3 | 332.5 ± 1 | 281.2 ± 3 | 84.5% |
| MO.4-1 | 336.1 ± 2 | 294.8 ± 3 | 87.7% |

TABLE 3b

Specific discharge capacities at 30° C.

| [mA · h/g] | 0.1 C | 0.33 C | 0.8 C | 1 C | 2 C | 4 C | 1 C/0.1 C |
|---|---|---|---|---|---|---|---|
| C-MO. 3 | 249 ± 2 | 236 ± 3 | 221 ± 3 | 214.7 ± 3 | 190 ± 5 | 136 ± 18 | 86.0% |
| MO. 4-1 | 263 ± 3 | 257 ± 2 | 241 ± 5 | 238 ± 2 | 220 ± 2 | 178 ± 9 | 90.5% |

TABLE 4

Specific discharge capacities during cycling at C/3 at 30° C.

| | 1st [mA · h/g] | 10th [mA · h/g] | 50th [mA · h/g] | 80th [mA · h/g] | Q80/Q1 [%] |
|---|---|---|---|---|---|
| C-MO.3 | 226 ± 3 | 221 ± 3 | 207 ± 4 | 188 ± 6 | 83.2% |
| MO.4-1 | 253 ± 1.6 | 249 ± 1.4 | 236 ± 3 | 220 ± 7 | 87.0% |

Average and maximum deviation of three cells per sample

TABLE 5

$CO_2$ evolution from 1.03 g cathode active materials mixed with 240 µl of 1.5M $LiClO_4$ in ethylene carbonate at 60° C.

| | $CO_2$ [µmol] after 3 h | $CO_2$ [µmol] after 7 h | $CO_2$ [µmol] after 12 h |
|---|---|---|---|
| C-MO.3* | 7 | 8 | 9 |
| C-MO.3** | 20 | 26 | 30 |
| MO.1** | 11 | 13 | 15 |

The $CO_2$ evolution is measured by On-line Electrochemical Mass Spectrometry (OEMS)

Alternative cycling conditions of inventive cells and comparative cells for coin cells based upon MO.5:

The first two cycles were performed at C/10 rate, charging to 4.3V and discharged to 3V with a 30 min constant voltage step at 4.3 V. The C rate is defined as 185 mAh/g. All subsequent cycles were charged at C/2 rate and discharged at different rates namely 0.2 C, 0.5 C, 1 C, 2 C, 3 C, 5 C and 0.2 C rate for two cycles each and continued to cycling at 1 C rate up to 125 Cycles. The specific capacities obtained initially and at various rates and cycling are shown in Tables 5-7.

TABLE 6

Specific discharge capacities during cycling at 1 C at 25° C.

| | Cycling | | | | | | |
|---|---|---|---|---|---|---|---|
| Sample | $1^{st}$ mAh/g | $10^{th}$ mAh/g | $30^{th}$ mAh/g | $50^{th}$ mAh/g | $100^{th}$ mAh/g | Q50/Q1 % | Q100/Q1 % |
| MO. 5 | 187.8 | 185.2 | 178.7 | 172.4 | 157.8 | 91.8 | 84.0 |
| MO. 5-1 | 189.4 | 188.2 | 185.1 | 181.1 | 170.3 | 95.6 | 89.9 |
| MO. 5-2 | 179.8 | 179.6 | 176.9 | 174.3 | 165.1 | 96.9 | 91.8 | average of 3 cells per sample

The invention claimed is:

1. A process for making a cathode active material for a lithium ion battery, said process comprising:
   (a) synthesizing a mixed oxide of formula $Li_{1+x}TM_{1-x}O_2$ at a temperature ranging from 750 to 1000° C. in an oxidizing atmosphere, wherein TM is a combination of two or more transition metals selected from the group consisting of Mn, Co and Ni and, optionally, at least one more metal selected from the group consisting of Ba, Al, Zr, W, Fe, Cr, K, Mo, Nb, Mg, Na and V, and x ranges from zero to 0.2,
   (b) cooling down the mixed oxide obtained from (a) to a temperature ranging from 100 to 400° C.,
   (c) forming sulfate and/or sulfite on a surface of the mixed oxide by reacting the mixed oxide with at least one reactant selected from the group consisting of $SO_2$ and $SO_3$ at the temperature of 100 to 400° C., and
   (d) cooling down to a temperature of 50° C. or below.

2. The process according to claim 1, wherein TM is a combination of metals of formula (I)

$$Ni_aCo_bMn_cM_d \qquad (I)$$

where
a ranges from 0.3 to 0.9,
b ranges from 0.05 to 0.4,
c ranges from 0.05 to 0.6,
d ranges from zero to 0.1,
M is selected from the group consisting of Ba, Al, Ti, Zr, W, Fe, Cr, K, Mo, Nb, Mg, Na and V, and
a+b+c+d=1.

3. The process according to claim 1, wherein said mixed oxide is synthesized from a mixture of at least one lithium salt and a mixed oxide, hydroxide, carbonate or oxyhydroxide of TM.

4. The process according to claim 3, wherein said lithium salt is selected from the group consisting of lithium hydroxide and lithium carbonate.

5. The process according to claim 1, wherein the oxidizing atmosphere in (a) is selected from the group consisting of air, oxygen and oxygen-enriched air.

6. The process according to claim 1, wherein in (c) said reactant is added to a stream of oxygen, oxygen-enriched dry air, dry air, nitrogen, a noble gas or a combination thereof.

7. The process according to claim 1, wherein (c) and (d) are performed in an atmosphere of air, oxygen, nitrogen, a noble gas or a combination thereof.

8. The process according to claim 7, wherein a concentration of the reactant ranges from 0.1 to 3% by volume, with respect to the atmosphere in which (c) is carried out.

9. The process according to claim 1, further comprising:
   (e) after (c) and before (d), maintaining the temperature in the range of from 100 to 400° C.

10. The process according to claim 9, wherein (a) and at least one of (b) to (e) is performed under a flow of gas.

11. The process according to claim 1, wherein (a) to (d) are performed in a roller hearth kiln, a pusher kiln or a rotary kiln.

* * * * *